3,578,730
THERMOPLASTIC POLYESTER-POLY-3-METHYL BUTENE-1 MOULDING COMPOSITIONS
Walter Herwig and Ludwig Brinkmann, Frankfurt am Main, and Klaus-Dieter Asmus, Hofheim, Taunus, Germany, assignors to Farbwerke Hoechst Aktiengesellschaft vormals Meister Lucius & Bruning, Frankfurt am Main, Germany
No Drawing. Filed Sept. 26, 1968, Ser. No. 763,012
Claims priority, application Germany, Oct. 7, 1967,
P 16 94 199.4
Int. Cl. C08f 29/10; C08g 39/20, 51/58
U.S. Cl. 260—873                                    10 Claims

ABSTRACT OF THE DISCLOSURE

Thermoplastic moulding compositions comprising linear saturated polyesters and poly-3-methylbutene-1 of which at least 80% of the particles are 10 microns or less and from which moulded articles of high dimensional stability can be made.

---

The practice of processing thermoplastic moulding compounds made from linear saturated polyesters of aromatic dicarboxylic acids into moulded articles is known. Moulded articles made from unmodified polyethylene terephthalate display poor dimensional stability. For example, when heated they shrink considerably, especially in the region of the setting temperature, thereby changing their shape in an uncontrollable manner. Measures have been proposed whereby polyethylene terephthalate is modified in a manner such that dimensionally stable moulded pieces are obtained. For example, in German patent specification No. 1,182,820 it is proposed that polyesters, especially polyethylene terephthalate, be mixed with polypropylene or poly-4-methylpentene-1. Although articles made from these moulding compounds display better dimensional stability compared with articles made from unmodified polyethylene terephthalate, it is still inadequate for many purposes.

The present invention is based on the observation that thermoplastic moulding compositions comprising a mixture of
(a) Linear, saturated polyesters of aromatic dicarboxylic acids and, optionally, small amounts of aliphatic dicarboxylic acids, and saturated aliphatic or cycloaliphatic diols and
(b) Poly-3-methylbutene-1 of which at least 80% of the particles are 10 microns or less in size, the poly-3-methylbutene-1 being present in amounts of 0.1 to 10, preferably 0.2 to 5, percent by weight, referred to the total weight of the mixture, have outstanding properties.

Moulded articles obtained in accordance with the invention from mixtures of the kind defined display a surprising degree of dimensional stability, even at elevated temperatures. Dimensional changes in injection-moulded articles at temperatures of 120 to 140° C. are of the order of less than 1%, even after several hours. Furthermore, when the mixtures are injected into heated moulds at a mould-residence time of less than 10 seconds, moulded articles showing a high degree of crystallinity are obtained, which remains virtually unchanged even when longer times of residence are used.

Inroganic nucleating agents may also be added to the polyester moulding compounds in order to further increase the rate of crystallization. For example, finely divided calcium carbonate, aluminium silicate or talcum may be used in known manner.

Admixture of the copolymer with the polymer composition may be effected in different ways. For example, the poly-3-methylbutene-1 may be finely dispersed by intensively stirring with the polyester melt. Fine dispersion is important because the polymer, which has a high melting point of 310° C., remains in the solid state at the customary polyester melt temperatures of about 270 to 290° C. Very fine dispersion may also be achieved by uniformly mixing the polyester granules or powder with the poly-3-methylbutene-1, melting the mixture in an extruder, extruding with cooling and then granulating.

Polyethylene glycol terephthalate is preferably used as linear, saturated polyester of aromatic dicarboxylic acids. Other polyesters, for example, polycyclohexane-1,4-dimethylolterephthalate, may also be used. It is also possible to use modified polyethylene glycol terephthalates which, in addition to terephthalic acid, contain other aromatic or even aliphatic dicarboxylic acids as structural units, for example, naphthalene-dicarboxylic acid-2,6 or adipic acid. Furthermore, modified polyethylene glycol terephthalates may be used which contain, in addition to ethylene glycol, other aliphatic diols, for example, neopentyl glycol or butanediol-1,4, as alcoholic components. The polyesters must have a reduced specific viscosity of between 0.6 and 2 dl./g. preferably between 0.9 and 1.5 dl./g. measured in a 1% solution in phenol/tetrachloroethane (60:40) at 25° C. Polyesters having a lower reduced specific viscosity may also be used, and the required higher viscosity may be obtained by condensation during the mixing process. Furthermore, the mixture may be brought to the required viscosity in the solid phase by subsequent condensation by known methods.

A polymer having a molecular weight of at least about 5,000, preferably above 50,000 is used as poly-3-methylbutene-1. At least 80% of its particles, preferably more than 90%, must measure 10μ or less.

By virtue of the good properties of the moulded articles, high-quality products may be manufactured by the process of the invention, for example, cog-wheels, clutch plates, trunnion bearings, and so forth.

The following example serves to illustrate the invention but it is not intended to limit it thereto.

EXAMPLE 4 kilograms of polyethylene glycol terephthalate powder having a reduced specific viscosity of 1.36 dl./g. were intensively mixed with 80 grams of poly-3-methylbutene-1 powder of which 80% of the particles measured 10μ or less, the mixture was homogenized in an extruder (time in cylinder: 1.5 minutes; screw speed: 3.6 r.p.m.) and then granulated. Plates measuring 120 x 80 x 6 mm. were injection-moulded from the dried material (mould temperature: 140° C.). These plates were placed in a heating cabinet on a thin layer of talcum and heated therein for 2 hours at 140° C. The following table indicates the density, lengthwise shrinkage and transverse shrinkage after annealing in respect of plates that have been subjected to different periods of residence in the mould.

| Time in mould, seconds: | Density at 20° C. | Shrinkage in percent after annealing for 2 hrs. at 140° C. | |
|---|---|---|---|
| | | Lengthwise | Transverse |
| 10 | 1.366 | 0.8 | 0.9 |
| 30 | 1.367 | 0.7 | 0.8 |
| 45 | 1.368 | 0.5 | 0.6 |
| 60 | 1.368 | 0.5 | 0.6 |

The shrinkage figures of mixtures of polyethylene terephthalate with polypropylene or poly-4-methylpentene-1, which were obtained under the same conditions, are between 1.8 and 3.8%.

What is claimed is:
1. A thermoplastic moulding composition consisting essentially of
   (a) a linear, saturated polyester of an aromatic dicarboxylic acid and a saturated aliphatic or cycloaliphatic diol, said polyester having a reduced specific viscosity of between 0.6 and 2 dl./g. measured in a 1% solution in a 60:40 mixture of phenol and tetrachloroethane at 25° C., and
   (b) from 0.1 to 10 percent by weight of poly-3-methylbutene-1 having a molecular weight of at least about 5,000, at least 80% of the said polybutene measuring 10μ or less.

2. A thermoplastic moulding composition as claimed in claim 1, wherein the polyester is polyethylene glycot terephthalate.

3. A thermoplastic moulding composition as claimed in claim 1, wherein the polyester is polycyclohexane-1,4-dimethylol-terephthalate.

4. A thermoplastic moulding composition as claimed in claim 1, wherein the polyester contains, in addition to terephthalic acid units, units of other aromatic or aliphatic dicarboxylic acids.

5. A thermoplastic moulding composition as claimed in claim 1, wherein the polyester contains, in addition to terephthalic acid units, units of other dicarboxylic acids selected from the group of naphthalene-2,6-dicarboxylic acid and adipic acid.

6. A thermoplastic moulding composition as claimed in claim 1, wherein the polyester contains, in addition to ethylene glycol units, units of other aliphatic or cycloaliphatic diols.

7. A thermoplastic moulding composition as claimed in claim 1, wherein the polyester contains, in addition to ethylene glycol units, units of other diols selected from the group of neopentyl glycol and butane-diol-1,4.

8. A thermoplastic moulding composition as claimed in claim 1, wherein the polyester has a reduced specific viscosity of from 0.9 to 1.5 dl./g. measured in a 1% solution in a 60:40 mixture of phenol and tetrachloroethane at 25° C.

9. A thermoplastic moulding composition as claimed in claim 1, wherein the poly-3-methylbutene-1 has a molecular weight above 50,000.

10. Shaped articles made from the thermoplastic moulding composition claimed in claim 1.

References Cited

UNITED STATES PATENTS

| | | | |
|---|---|---|---|
| 3,361,848 | 1/1968 | Siggel et al. | 260—873 |
| 3,504,080 | 3/1970 | Siggel et al. | 260—873 |
| 3,405,198 | 10/1968 | Rein et al. | 260—873 |

FOREIGN PATENTS

| | | | |
|---|---|---|---|
| 1,054,303 | 1/1967 | Great Britain | 260—873 |

WILLIAM H. SHORT, Primary Examiner

E. WOODBERRY, Assistant Examiner

U.S. Cl. X.R.

260—45.7